(12) United States Patent
Athaide et al.

(10) Patent No.: US 7,499,550 B2
(45) Date of Patent: Mar. 3, 2009

(54) SYSTEM AND METHOD FOR PROTECTING A TITLE KEY IN A SECURE DISTRIBUTION SYSTEM FOR RECORDABLE MEDIA CONTENT

(75) Inventors: Deirdre Michelle Joy Athaide, Mississauga (CA); Kevin Thomas Driver, Austin, TX (US); Lara M. Lewis, San Jose, CA (US); Jeffrey Bruce Lotspiech, Henderson, NV (US); Florian Pestoni, Mountain View, CA (US); Savitha Srinivasan, San Jose, CA (US); Vladimir Zbarsky, Newark, CA (US)

(73) Assignee: International Business Machines Corporation, Armonk, NY (US)

( * ) Notice: Subject to any disclaimer, the term of this patent is extended or adjusted under 35 U.S.C. 154(b) by 582 days.

(21) Appl. No.: 10/775,596

(22) Filed: Feb. 9, 2004

(65) Prior Publication Data

US 2005/0177740 A1    Aug. 11, 2005

(51) Int. Cl.
*H04L 9/00* (2006.01)
*H04L 9/32* (2006.01)
*G06F 7/04* (2006.01)
*H04K 1/00* (2006.01)

(52) U.S. Cl. .................. 380/278; 713/193; 713/168; 726/26; 705/57; 380/277

(58) Field of Classification Search .............. 713/193, 713/168; 380/277, 278; 705/57; 726/26
See application file for complete search history.

(56) References Cited

U.S. PATENT DOCUMENTS 6,097,814 A    8/2000  Mochizuki ............... 380/44

(Continued)

FOREIGN PATENT DOCUMENTS

JP         11-283326        10/1999

OTHER PUBLICATIONS

Intel Literature Center, Protecting Content in the Digital Age, Balancing creative Use with Creator rights, 2002. Intel, p. 1-4.*

(Continued)

*Primary Examiner*—Emmanuel L Moise
*Assistant Examiner*—Techane J Gergiso
(74) *Attorney, Agent, or Firm*—Cantor Colburn LLP; Leonard Guzman

(57) ABSTRACT

A title key protection system includes a title key with recordable media content; storage in a repository is not required. The title key is decrypted when needed by a clearinghouse, and then re-encrypted. The title key confers rights from the content owners to the user to play and copy the content for personal use. A user downloads encrypted content from a content repository. The user's media recording device extracts an encrypted title key from the content and obtains a media key block and media ID from the physical media on which the content will be recorded. The encrypted title key, media key block, and media ID are transmitted to a clearinghouse. The clearinghouse decrypts the title key and derives a media unique key from the media key block and media ID. The clearinghouse re-encrypts the title key with the media unique key and returns this re-encrypted title key to the media recording device for recording with the content on the physical media.

34 Claims, 5 Drawing Sheets

U.S. PATENT DOCUMENTS

| | | | |
|---|---|---|---|
| 6,118,873 A | 9/2000 | Lotspiech et al. | 380/277 |
| 6,460,137 B1 | 10/2002 | Akiyama et al. | 713/160 |
| 6,778,969 B2* | 8/2004 | Oshima et al. | 705/57 |
| 6,873,975 B1* | 3/2005 | Hatakeyama et al. | 705/51 |
| 7,020,636 B2* | 3/2006 | Ohmori et al. | 705/51 |
| 7,092,527 B2* | 8/2006 | Foster et al. | 380/277 |
| 7,159,244 B2* | 1/2007 | Matsushima et al. | 726/30 |
| 7,191,154 B2* | 3/2007 | Oshima et al. | 705/57 |
| 7,346,169 B2* | 3/2008 | Asano et al. | 380/278 |
| 2001/0011238 A1* | 8/2001 | Eberhard et al. | 705/27 |
| 2001/0021255 A1* | 9/2001 | Ishibashi | 380/277 |
| 2002/0069361 A1* | 6/2002 | Watanabe et al. | 713/185 |
| 2002/0085715 A1 | 7/2002 | Ripley | 380/202 |
| 2002/0104001 A1 | 8/2002 | Lotspiech et al. | 713/163 |
| 2002/0104019 A1* | 8/2002 | Chatani et al. | 713/201 |
| 2002/0123968 A1* | 9/2002 | Okayama et al. | 705/57 |
| 2002/0154772 A1* | 10/2002 | Morishita et al. | 380/201 |
| 2002/0186842 A1* | 12/2002 | Sabet-Sharghi et al. | 380/200 |
| 2003/0005309 A1* | 1/2003 | Ripley et al. | 713/185 |
| 2003/0007640 A1* | 1/2003 | Harada et al. | 380/270 |
| 2003/0009668 A1 | 1/2003 | Chan et al. | 713/171 |
| 2003/0009681 A1* | 1/2003 | Harada et al. | 713/193 |
| 2003/0051151 A1* | 3/2003 | Asano et al. | 713/193 |
| 2003/0072453 A1* | 4/2003 | Kelly et al. | 380/278 |
| 2003/0095664 A1 | 5/2003 | Asano et al. | 380/277 |
| 2003/0120942 A1* | 6/2003 | Yoshida et al. | 713/193 |
| 2003/0185128 A1* | 10/2003 | Shoji et al. | 369/59.25 |
| 2003/0217011 A1* | 11/2003 | Peinado et al. | 705/59 |
| 2003/0233561 A1* | 12/2003 | Ganesan et al. | 713/193 |
| 2005/0044046 A1* | 2/2005 | Ishiguro | 705/57 |
| 2005/0105735 A1* | 5/2005 | Iino et al. | 380/277 |
| 2007/0005989 A1* | 1/2007 | Conrado et al. | 713/189 |

OTHER PUBLICATIONS

Intel, Content Protection in the Digital Home, 2002, Intel Technology Journal, p. 49-56.*

* cited by examiner

SYSTEM AND METHOD FOR PROTECTING A TITLE KEY IN A SECURE DISTRIBUTION SYSTEM FOR RECORDABLE MEDIA CONTENT

FIELD OF THE INVENTION

The present invention generally relates to a system for encrypting copyrighted content such as music or movies. More specifically, the present invention pertains to a method for protecting a title key of content by eliminating the need to store that title key in a repository database, protecting such content from unauthorized use or distribution.

BACKGROUND OF THE INVENTION

The entertainment industry is in the midst of a digital revolution. Music, television, and movies are increasingly becoming digital, offering new advantages to the consumer in quality and flexibility. At the same time the digital revolution also comprises a threat since digital data can be perfectly and quickly copied. If consumers may freely copy entertainment content and offer that content on the Internet, the market for entertainment content would evaporate.

The rapid growth in the distribution of recordable media over the Internet, such as MP3s and DVDs, is especially alarming to content owners. These highly controversial and unauthorized distribution channels have caused an increase in demand from the entertainment industry for methods to protect their multi-million dollar content. Developing a content protection system that offers content owners an end-to-end solution they can use to securely distribute their media is becoming increasingly important as the amount of content shared across the Internet grows exponentially each year.

Recently, developments in consumer electronics have created an alternative to traditional digital rights management systems. New recording and playing devices that use this new method, known as CPRM (Content Protection for Recordable Media) technology, have reached the market. It is now possible to directly record content protected in CPRM to writable media. If the recording is prepared in a server the client needs no special keys or tamper-resistance. This method of content protection utilizes broadcast encryption. Devices do not need to have a conversation to establish a common key. Recent advances in broadcast encryption have made it as powerful as public-key cryptography in terms of revocation power. Because of its one-way nature, broadcast encryption is inherently suited to protect content on storage.

Once the client receives the encrypted recordable media content using CPRM, the interaction between the content server and the client side module is complete. The server is now free to focus on other requests. On the client side, CPRM requires that the encrypted content be recorded onto a physical piece of media, such as a DVD. This recording is performed in such a way that the encrypted content can only be played by a compliant device while it is on that particular piece of media. Consequently, encrypted content copied to another physical piece of media cannot by played by a compliant device.

CPRM devices use the media key block and media ID located currently on blank DVD recordable disks to calculate a media unique key. The media unique key is used to encrypt title keys. In turn, the title keys encrypt the content stored on the DVDs. Encrypting the title keys in the media unique key causes the title keys to become cryptographically bound to the particular piece of physical media on which the content is burnt. This prevents the content from being decrypted and accessed from any other physical piece of media.

Although this technology has proven to be useful, it is desirable to present additional improvements. In a server-based CPRM system, the calculation that binds the title key to the media is performed on the server-side, not the client-side. However, there is currently no means by which the server may learn the title key other than storing the title key in a database. Such a database is difficult to maintain in a secure and tamper-resistant environment.

What is therefore needed is a system, a computer program product, and an associated method for protecting a title key while providing means for the clearinghouse server to learn the title key. The need for such a solution has heretofore remained unsatisfied.

SUMMARY OF THE INVENTION

The present invention satisfies this need, and presents a system, a computer program product, and an associated method (collectively referred to herein as "the system" or "the present system") for including the title key with recordable media content in such a manner that storage in a repository is not required. Rather, the title key is decrypted when needed by a clearinghouse, and then re-encrypted. The title key confers rights from the content owners to the user to play and copy the content for personal use. Without a title key, a media recording device will neither play nor copy the recordable media content.

Using the present system, a user purchases encrypted recordable media content from a content provider through a content repository. This recordable media content is downloaded to the user's media recording device. The user's media recording device extracts an encrypted title key from the recordable media content. The media recording device also obtains a media key block and media ID from the physical media on which the recordable media content will be recorded. The encrypted title key is transmitted to a clearinghouse along with the media key block and the media ID. The clearinghouse decrypts the title key and derives a media unique key from the media key block and media ID. The clearinghouse then re-encrypts the title key with the media unique key, creating a re-encrypted title key for recording on the physical media. This re-encrypted title key is unique to the physical media. The re-encrypted title key provides authorization required by the media recording device to play the recordable media content that has been recorded on the physical media.

The present system uses a media key block to encrypt and decrypt the title key. Each media player has a unique set of keys that allow the media player to process the media key block; however, each device follows a unique path through the media key block. All legitimate devices end up with a media key as the result of the decryption. However, if circumvention devices appear, newly released physical media can be manufactured so that the circumvention devices, following their particular paths through the media key block, get the wrong answer. All innocent devices continue to correctly calculate the media key. Consequently, only the circumvention devices are excluded from the system.

The present system uses the media key block on the physical media as an aid to deliver content keys across the Internet, thereby avoiding a single global secret. A web service provider or other processing center delivers an encrypted title key across the Internet. Possession of the correctly encrypted title key by the user verifies that a user has received the right to play and record the recordable media content. Consequently, content owners wish to protect the title keys for their content. Rather than store the title key, the present system provides a method by which the title key can be decrypted when needed.

The clear advantage of the present system is that a database is not required by a clearinghouse to store title keys for content. Even if it has not seen a particular piece item of content before, the clearinghouse is able to decrypt the title key. The clearinghouse can then re-encrypt the title key in the media unique key specific to the physical media on which the content will be recorded. Using the present system, only the processing of the title key is required to be secure and tamper-resistant. Secure processing is well within the current art; however, databases storing title keys are targets for attacks and difficult to keep secure, especially when the clearing house must act on behalf of several different content owners who are competitors, each needing to store their own keys.

The present system provides a level of abstraction away from the actual encrypted content, eliminating interaction between the clearinghouse and the content repository that stores the content. Consequently, the clearinghouse is less complex than a full content repository and can be placed anywhere that is accessible by a media recording device such as a DVD player. The clearinghouse is not tied to a database or content repository location.

In addition, the clearinghouse server and the content repository server may be completely independent, allowing deployment of additional business models. For example, the content owners may operate the content servers while an electronic retail store may operate the clearinghouse.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

The following definitions and explanations provide background information pertaining to the technical field of the present invention, and are intended to facilitate the understanding of the present invention without limiting its scope:

Internet: A collection of interconnected public and private computer networks that are linked together with routers by a set of standard protocols to form a global, distributed network.

World Wide Web (WWW, also Web): An Internet client-server hypertext distributed information retrieval system.

Content: copyrighted media such as music or movies presented in a digital format on electronic devices.

Figure 1:
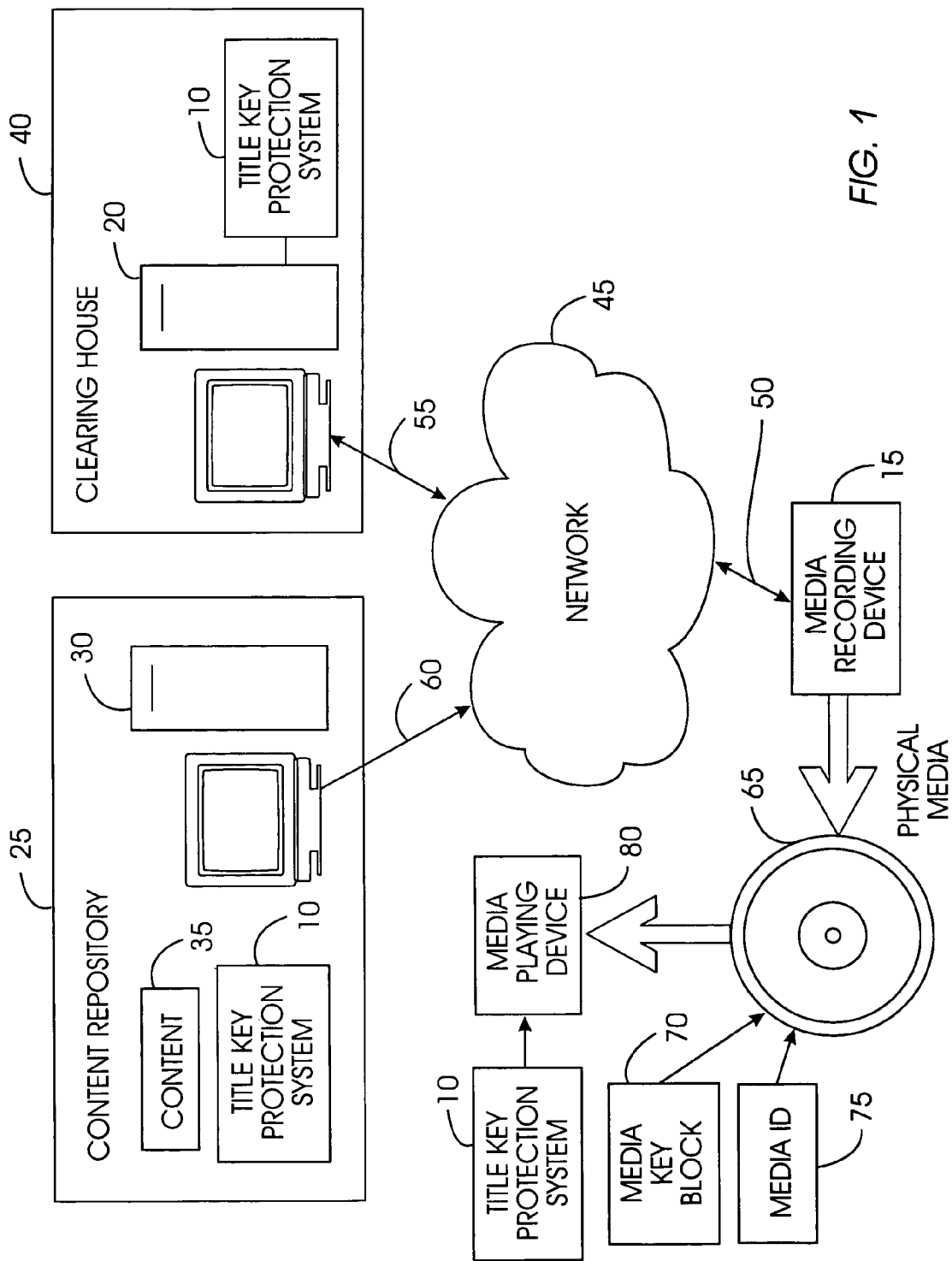
FIG. 1 is a schematic illustration of an exemplary operating environment in which a title key protection system of the present invention can be used.

FIG. 1 portrays an exemplary overall environment in which a system and method for protecting a title key in a secure distribution system for recordable media content according to the present invention may be used. A title key protection system 10 comprises a software programming code or a computer program product that is typically embedded within, or installed on a media playing device 80, a clearinghouse server 20, and a content repository 25. Alternatively, the title key protection system 10 can be saved on a suitable memory or storage medium such as a diskette, a CD, a DVD, a hard drive, or like devices.

Content repository 25 comprises a content repository server 30 and recordable media in the form of content 35. Content 35 comprises any recordable media such as, for example, a software program, music, a movie, a game, a book, etc. A clearinghouse 40 comprises the clearinghouse sever 20. Clearinghouse 40 and content repository 25 may be part of the same content providing entity. Conversely, clearinghouse 40 and content repository 25 may be separate entities. For example, content owners may operate content repository 25 while a third party retailer may operate clearinghouse 40.

The media recording device 15 can access the clearinghouse server 20 and the content repository server 30 through a network 45. The media recording device 15 comprises software that allows the media recording device 15 to interface securely with the clearinghouse server 20 and the content repository server 30. The media recording device may be a personal computer with appropriate software and hardware, or it may be a special purpose device such as a DVD video recorder.

The media recording device 15 is connected to network 45 such as the Internet via a communications link 50 such as telephone, cable, DSL, satellite link, etc. The clearinghouse server 20 is connected to the Internet through a communications link 55 and the content repository server 30 is connected to the Internet through a communications link 60.

The media playing device 80 can comprise any compliant module that can verify the physical presence of media such as, for example, a disc. A compliant module is one that follows the usage rules that are cryptographically bound to content downloaded from content repository server 30. Media playing devices 80 comprise, for example, computers, DVD players, game players, etc.

A user may download content 35 from the content repository server 30 to the media recording device 15, which records it on physical media 65. Content 35 may be purchased, rented, or provided free of charge by content repository 25. The user may wish to play content 35 on media playing device 80, using the physical media 65. The physical media 65 comprises a media key block 70 and a media ID 75 that have been inserted in the physical media 65 when manufactured. In some cases, the media recording device 15 and the media playing device 80 may be the same physical device with both recording and playing functions.

The content repository server 30, the clearinghouse server 20, the media recording device 15, and the media playing device 80 interact within the constraints of licensing from content owners to provide means for the user to play content 35 on the media playing device 80 or make a legal copy of content 35 on the physical media 65.

Figure 2:
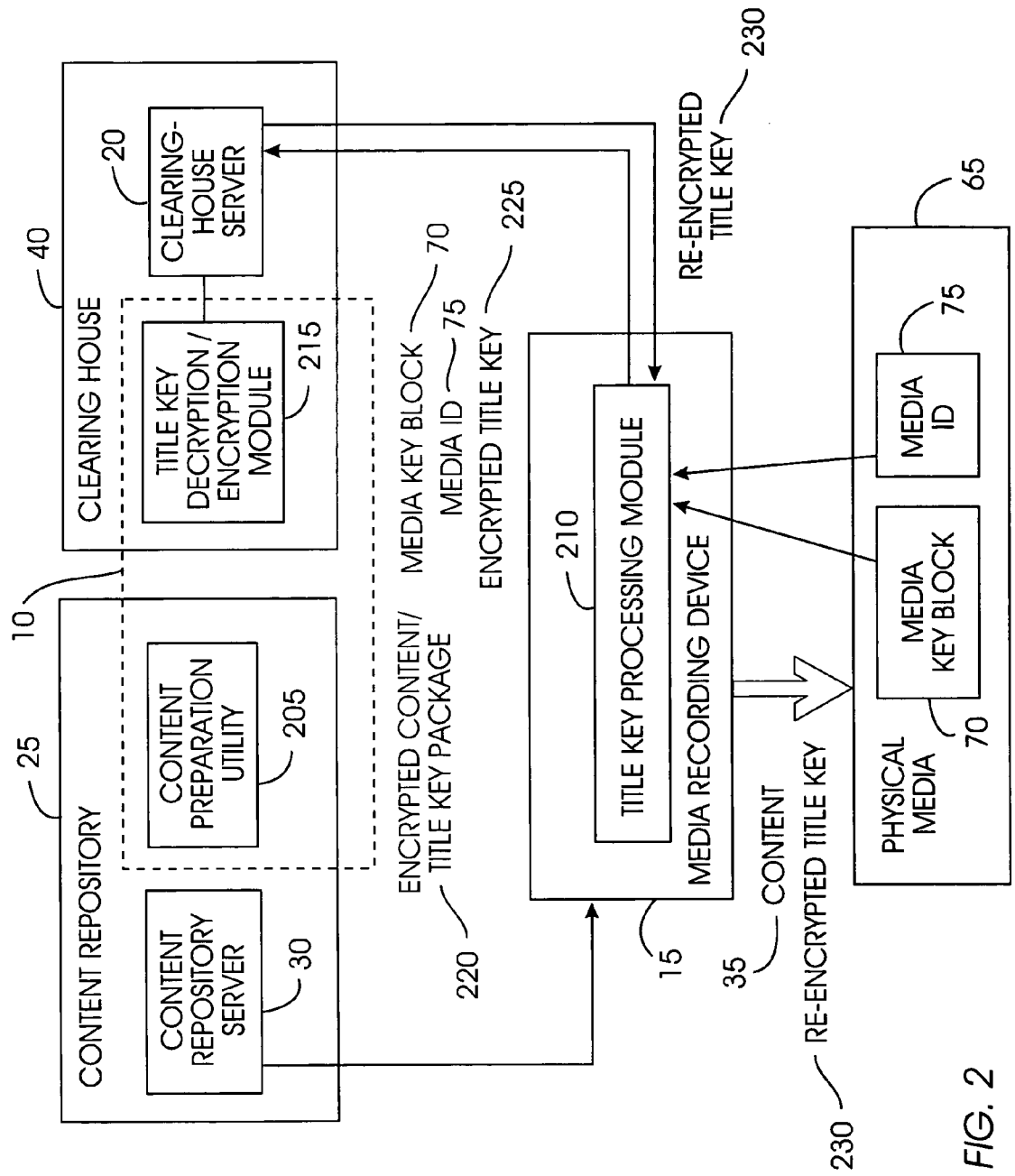
FIG. 2 is a block diagram of the high-level architecture of the title key protection system of FIG. 1.

The block diagram of FIG. 2 illustrates a high-level architecture of the title key protection system 10. The title key protection system 10 comprises a content preparation utility 205 in the content repository 25 media recording device and a title key decryption/encryption module 215 on the clearinghouse server 20. The content repository server 30 provides content 35 to the media recording device 15 in the form of an encrypted content/title key package 220. The media recording device 15 comprises a title key processing module 210.

The media recording device 15 extracts the encrypted title key 225 from the encrypted content/title key package 220.

The media recording device 15 provides to the title key decryption/encryption module 215 the media key block 70, the media ID 75, and the encrypted title key 225. The title key decryption/encryption module 215 extracts a media unique key from the media key block 70 and the media ID 75. The title key decryption/encryption module 215 then decrypts the encrypted title key 225 and re-encrypts it using the media unique key, creating a re-encrypted title key 230 that is unique to physical media 65. The clearinghouse server 20 returns the re-encrypted title key 230 to the media recording device 15 for burning on the physical media 65 with content 35.

Figure 3A:
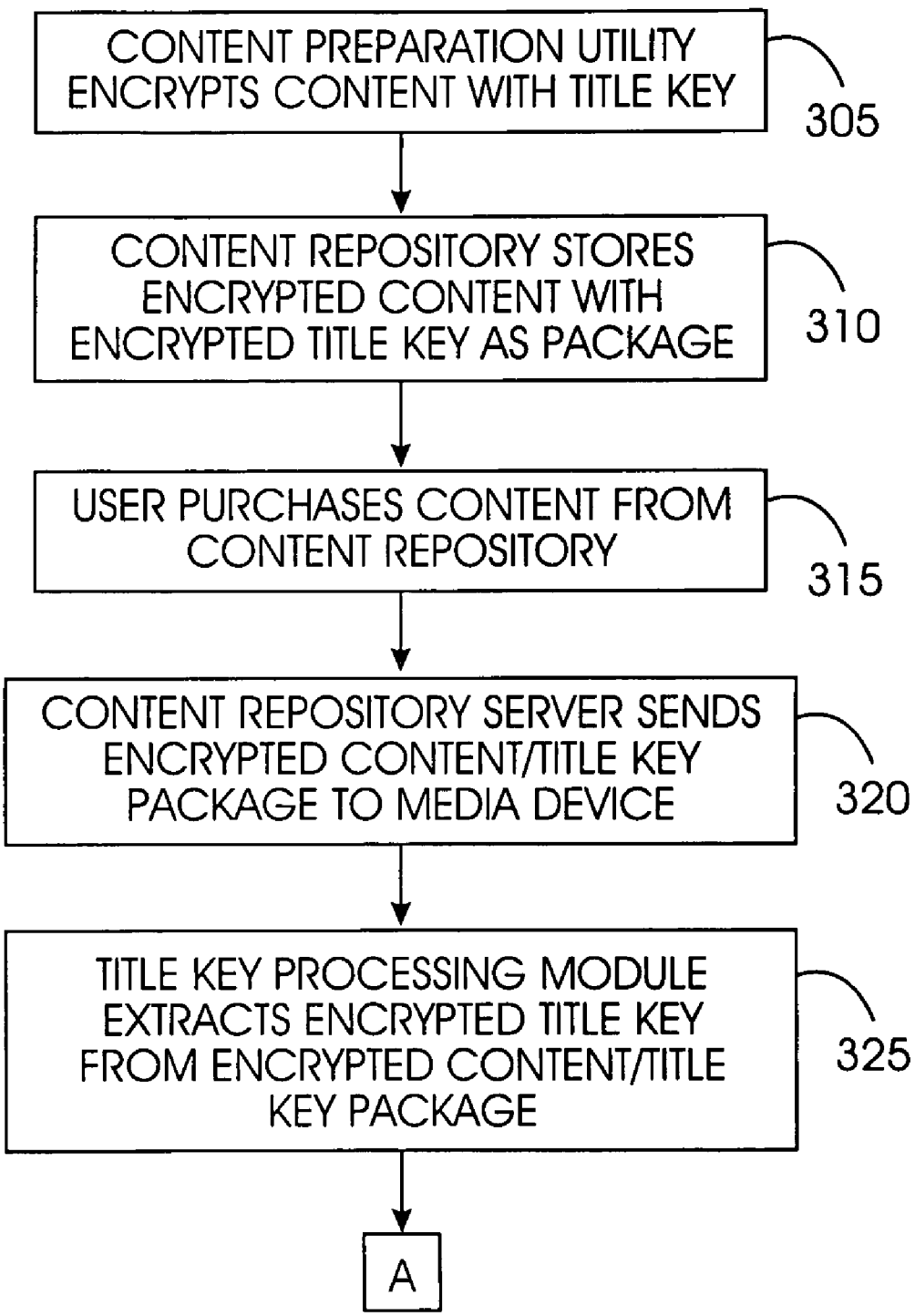
FIG. 3 is comprised of FIGS. 3A and 3B and represents a process flow chart illustrating a method of operation of the title key protection system of FIGS. 1 and 2.
Figure 3B:
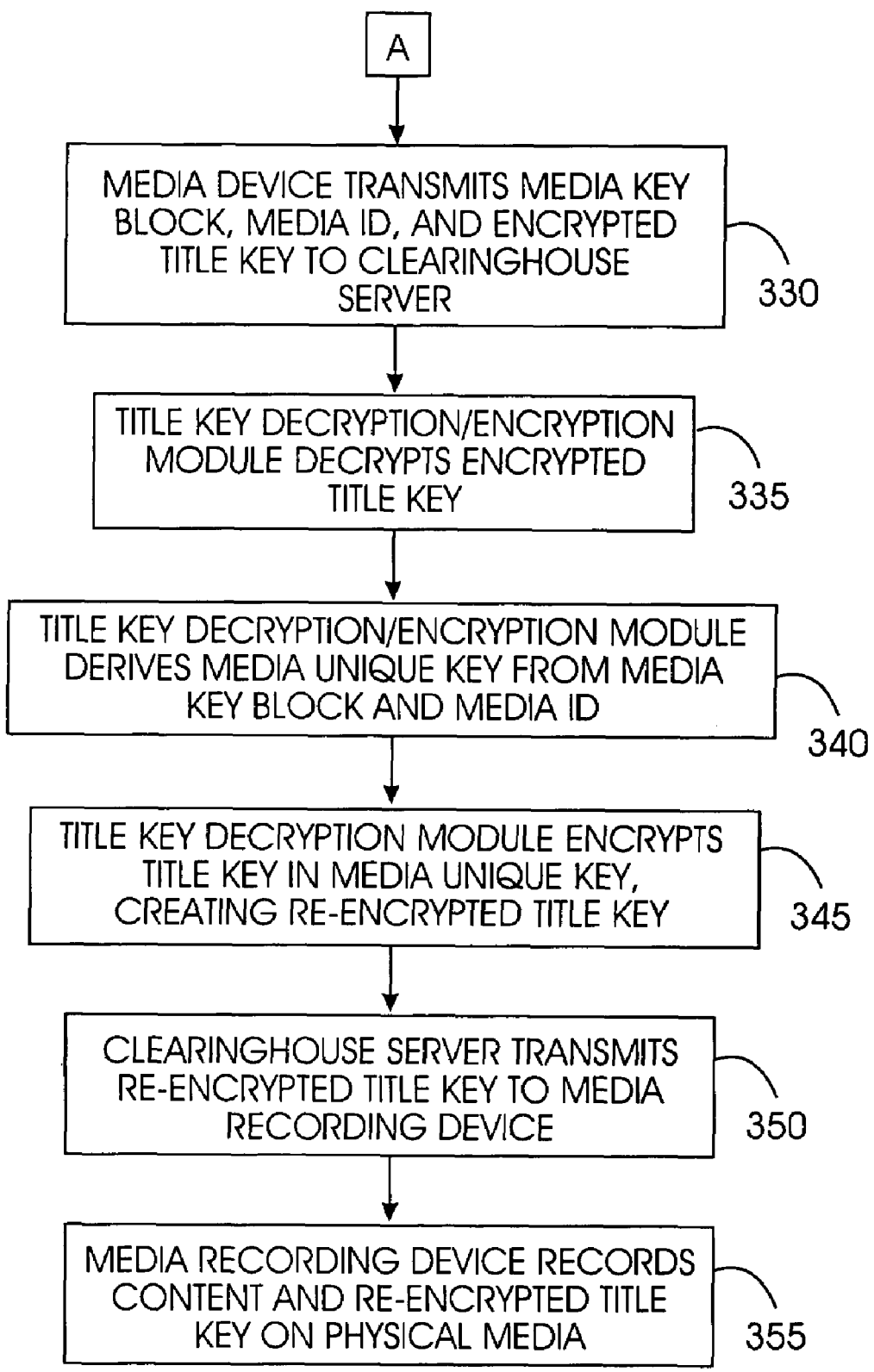

A method 300 for obtaining the re-encrypted title key 230 for media recording device recording content 35 onto the physical media 65 for later playing by media playing device 80 is illustrated by the process flow chart of FIG. 3 (FIGS. 3A, 3B). At step 305, the content preparation utility 205 prepares recordable media such as content 35 by encrypting content 35 with a title key. The title key may, for example, be randomly selected. The title key is encrypted with content 35 in a manner agreed upon between the clearinghouse 40 and the content repository 25, creating an encrypted content/title key package 220.

All methods for encrypting the title key with content 35 are within the scope of the title key protection system 10. Exemplary encryption methods comprise the use of a common key agreed upon between the clearinghouse 40 and the content repository 25, the use of a public key provided by the clearinghouse server 20, and the use of a key from a media key block.

The content repository server 30 stores the encrypted content/title key package 220 at step 310. The title key is encrypted and packaged with content 35 that has been encrypted by the content preparation utility 205 and stored as one transparent encrypted entity in the content repository 25. By storing the content 35 and the title key in encrypted form in the content repository 25, the content repository 25 needs no tamper-resistant storage to protect the title key.

The user accesses the content repository server 30 at step 315 and obtains content 35. Content 35 may be provided for purchase, rent, or for free to the user by the content repository 25. The content repository server 30 responds to the request and transmits the encrypted content/title key package 220 to the media recording device 15 at step 320. The title key processing module 210 extracts an encrypted title key 225 from the encrypted content/title key package 220.

The media recording device 15 transmits the media key block 70, the media ID 75, and the encrypted title key 225 to the clearinghouse server 20 at step 330. The title key decryption/encryption module 215 decrypts the encrypted title key 225 at step 335 in a cryptographic protocol pre-arranged the content repository 25. The title key decryption/encryption module 215 derives a media unique key at step 340 from the media key block 70 and the media ID 75. At step 345, the title key decryption/encryption module 215 encrypts the title key in the media unique key, creating a re-encrypted title key 230. The clearinghouse server 20 transmits the re-encrypted title key 230 to the media recording device 15 at step 350. The media recording device 15 records the content 35 and the re-encrypted title key 230 on the physical media 65 at step 355. The media can now be played on media playing device 80.

Figure 4:
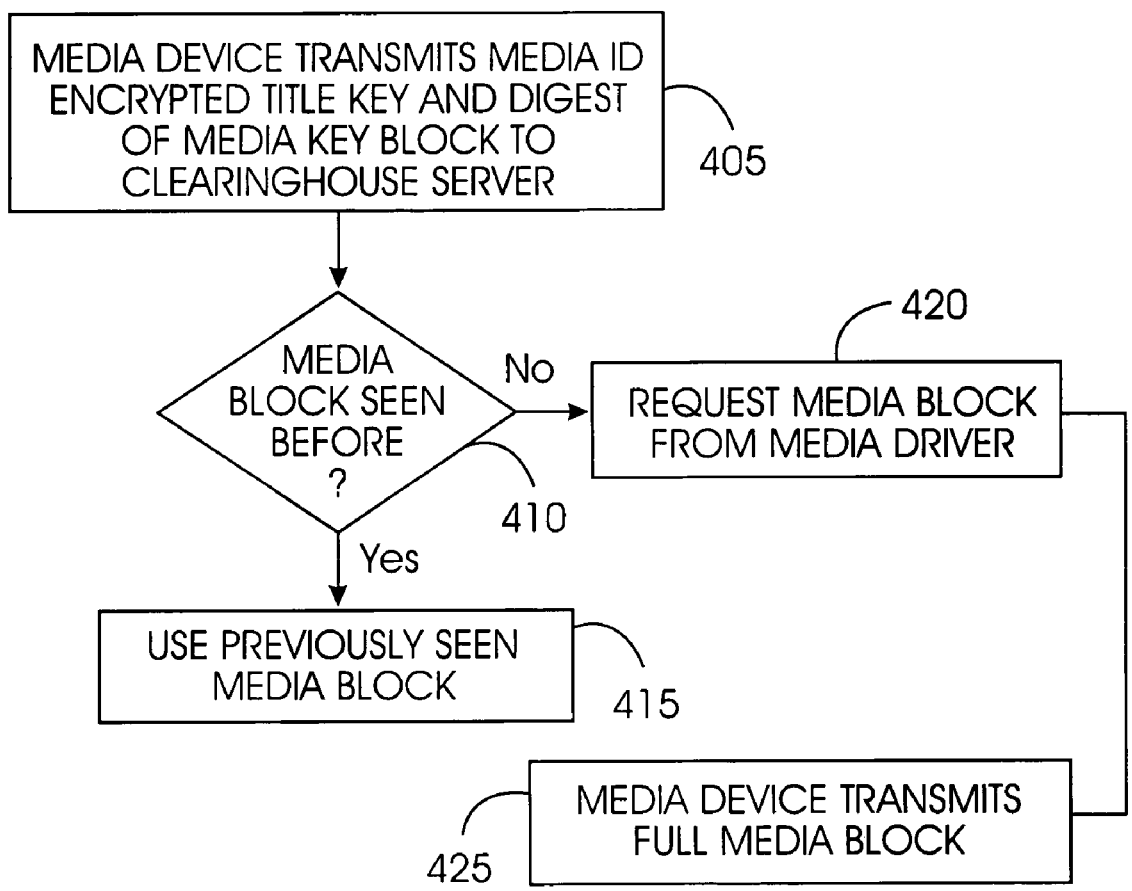
FIG. 4 is a process flow chart illustrating an embodiment of a method of the title key protection system of FIGS. 1 and 2 in transmitting a media key block.

In an embodiment, step 330 may be modified as illustrated in FIG. 4 to minimize the amount of data transmitted on average from the media recording device 15 to the clearinghouse server 20. The media key blocks 70 are mass-produced. For example, a single media key block 70 may be pressed into up to a million DVD recordable blank discs. Consequently, it is very likely that any given media key block 70 has already been seen by the clearinghouse 40 from a previous transaction.

The media recording device 15 transmits a short digest of the media key block 70 to the clearinghouse server 20 at step 405 in addition to the media ID 75 and the encrypted title key 225. The title key decryption/encryption module 215 determines at decision step 410 whether the media key block 70 has been previously seen. If yes, the title key decryption/encryption module 215 uses the previously seen media key block 70 at step 415. If no, the title key decryption/encryption module 215 requests the media key block 70 from the media recording device 15 at step 420. The media recording device 15 transmits the media key block 70 to the clearinghouse server 20 at step 425. In an embodiment, the verification data in bytes 5 through 12 of the media key block 70 uniquely identifies the media key block 70 and can be sent as the digest. However, all techniques of making a digest such as, for example, a cryptographic hash of the media key block 70, are within the scope of the title key processing module system 210.

It is to be understood that the specific embodiments of the invention that have been described are merely illustrative of certain applications of the principle of the present invention. Numerous modifications may be made to a system and method for protecting a title key in a secure distribution system for recordable media content described herein without departing from the spirit and scope of the present invention. Moreover, while the present invention is described for illustration purpose only in relation to the WWW, it should be clear that the invention is applicable as well, for example, to an intranet, a wide area network, or any other network in which devices may interconnected for communications purposes.

What is claimed is:

1. A processor-implemented method of protecting a title key for a recordable media content in a secure distribution system, comprising:

creating an encrypted content and title key package by encrypting the title key along with the recordable media content;

transmitting the encrypted content and title key package to a media recording device;

extracting an encrypted title key from the encrypted content and title key package;

obtaining a media key block and a media ID from a physical media;

transmitting the encrypted title key, a digest of the media key block, and the media ID to a clearinghouse server utilizing a title key decryption and encryption module, wherein the clearinghouse server does not pre-store the title key which comprises an underlying title key upon which a plurality of encrypted title keys, including the encrypted title key, are based; wherein the title key decryption and encryption module determines whether or not a complete media key block corresponding to the digest of the media key block has been previously seen by the title key decryption and encryption module and, if so, the title key decryption and encryption module utilizing the previously seen media block; and, if the complete media key block corresponding to the digest of the media key block has not been previously seen by the title key decryption and encryption module, then the title key decryption and encryption module requesting the complete media key block from the media recording device;

decrypting the encrypted title key;

deriving a unique media key for the physical media;

creating a re-encrypted title key by encrypting the title key with the unique media key; and transmitting the re-encrypted title key to the media recording device to record on the physical media with the recordable media content.

2. The method of claim 1, further comprising encrypting the recordable media content with the title key.

3. The method of claim 2, further comprising randomly selecting the title key.

4. The method of claim 2, wherein encrypting the title key comprises encrypting the title key with the recordable media in a manner agreed upon between a recordable media content repository and the clearinghouse server for processing the title key.

5. The method of claim 4, wherein encrypting the title key comprises encrypting the title key with a common key that is agreed upon between the recordable media content repository and the clearinghouse server.

6. The method of claim 4, wherein encrypting the title key comprises encrypting the title key with a public key that is provided by the clearinghouse server.

7. The method of claim 4, wherein encrypting the title key comprises encrypting the title key with a key obtained from the media key block.

8. The method of claim 4, wherein the recordable media content repository stores the encrypted content and title key package for any of sale or distribution to a user.

9. The method of claim 4, further comprising transmitting the encrypted content/title key package to the media recording device.

10. The method of claim 1, further comprising extracting the encrypted title key from the encrypted content and title key package.

11. The method of claim 10, further comprising decrypting the encrypted title key using the media key block and the media ID.

12. The method of claim 11, further comprising deriving a media unique key from the media key block and the media ID.

13. The method of claim 1, further comprising recording the content and the re-encrypted title key on the physical media.

14. A computer-readable storage medium having instruction embedded thereon for causing a system to implement a process for protecting a title key for a recordable media content in a secure distribution system, comprising:

for creating an encrypted content and title key package by encrypting the title key along with the recordable media content;

for transmitting the encrypted content and title key package to a media recording device;

extracting an encrypted title key from the encrypted content and title key package;

obtaining a media key block and a media ID from a physical media;

transmitting the encrypted title key, a digest of the media key block, and the media ID to a clearinghouse server utilizing a title key decryption and encryption module, wherein the clearinghouse server does not pre-store the title key which comprises an underlying title key upon which a plurality of encrypted title keys, including the encrypted title key, are based; wherein the title key decryption and encryption module determines whether or not a complete media key block corresponding to the digest of the media key block has been previously seen by the title key decryption and encryption module and, if so, the title key decryption and encryption module utilizing the previously seen media block; and, if the complete media key block corresponding to the digest of the media key block has not been previously seen by the title key decryption and encryption module, then the title key decryption and encryption module requesting the complete media key block from the media recording device;

decrypting the encrypted title key;

deriving a unique media key for the physical media;

creating a re-encrypted title key by encrypting the title key with the unique media key; and transmitting the re-encrypted title key to the media recording device to record on the physical media with the recordable media content.

15. The computer-readable storage medium of claim 14, wherein the process includes encrypting the recordable media content with the title key.

16. The computer-readable storage medium of claim 15, wherein the process includes randomly selecting the title key.

17. The computer-readable storage medium of claim 15, wherein the extracting encrypts the title key with the recordable media in a manner agreed upon between a recordable media content repository and the clearinghouse server for processing the title key.

18. The computer-readable storage medium of claim 17, wherein the extracting encrypts the title key with a common key that is agreed upon between the recordable media content repository and the clearinghouse server.

19. The computer-readable storage medium of claim 17, wherein the extracting encrypts the title key with a public key that is provided by the clearinghouse server.

20. The computer-readable storage medium of claim 17, wherein the extracting encrypts the title key with a key obtained from the media key block.

21. The computer-readable storage medium of claim 17, wherein the recordable media content repository stores the encrypted content and title key package for any of sale or distribution to a user.

22. The computer-readable storage medium of claim 17, wherein the process includes transmitting the encrypted content and title key package to the media recording device.

23. The computer-readable storage medium of claim 14, wherein the process includes extracting the encrypted title key from the encrypted content/title key package.

24. The computer-readable storage medium of claim 23, wherein the process includes decrypting the encrypted title key using the media key block and the media ID.

25. The computer-readable storage medium of claim 24, wherein the process includes deriving the media unique key from the media key block and the media ID.

26. The computer-readable storage medium of claim 14, wherein the process includes recording the content and the re-encrypted title key on the physical media.

27. A processor-implemented system for protecting a title key for a recordable media content in a secure distribution system, comprising:

a content repository server creates an encrypted content and title key package by encrypting the title key along with the recordable media content;

the content repository server transmits the encrypted content and title key package to a media recording device;

a title key decryption and encryption module extracts an encrypted title key from the encrypted content and title key package;

the title key decryption and encryption module obtaining a media key block and a media ID from a physical media;

the media recording device transmits the encrypted title key, a digest of the media key block, and the media ID to a clearinghouse server by means of the title key decryption and encryption module, wherein the clearinghouse server does not pre-store the title key which comprises an underlying title key upon which a plurality of encrypted title keys, including the encrypted title key, are based; wherein the title key decryption and encryption module determines whether or not a complete media key block corresponding to the digest of the media key block has been previously seen by the title key decryption and encryption module and, if so, the title key decryption and encryption module utilizes the previously seen media block; and, if the complete media key block corresponding to the digest of the media key block has not been previously seen by the title key decryption and encryption module, then the title key decryption and encryption module requests the complete media key block from the media recording device;

the clearinghouse server decrypts the encrypted title key and derives a unique media key for the physical media; and the clearinghouse server then creates a re-encrypted title key by encrypting the title key with the unique media key, and transmits the re-encrypted title key to the media recording device to record on the physical media with the recordable media content.

28. The system of claim 27, wherein the content repository server encrypts the recordable media content with the title key.

29. The system of claim 28, wherein the title key is a randomly selected key.

30. The system of claim 28, wherein the title key is encrypted with the recordable media in a manner agreed upon between a recordable media content repository and the clearinghouse server for processing the title key.

31. The system of claim 30, wherein the title key is encrypted with a common key that is agreed upon between the recordable media content repository and the clearinghouse server.

32. The system of claim 30, wherein the title key is encrypted with a public key that is provided by the clearinghouse server.

33. The system of claim 30, wherein the title key is encrypted with a key obtained from the media key block.

34. The system of claim 30, wherein the content repository server transmits the encrypted content and title key package to the media recording device.

* * * * *